United States Patent
Quinet et al.

(10) Patent No.: US 9,185,173 B2
(45) Date of Patent: Nov. 10, 2015

(54) COMPOSITE SERVICES PROVISION WITH CODE DOWNLOAD ON DEMAND

(75) Inventors: Raphaël Quinet, Liège (BE); Eugen Freiter, Berlin (DE); Roman Levenshteyn, Aachen (DE); Joerg Niemoeller, Sundbyberg (SE)

(73) Assignee: Telefonaktiebolaget L M Ericsson (publ), Stockholm (SE)

( * ) Notice: Subject to any disclaimer, the term of this patent is extended or adjusted under 35 U.S.C. 154(b) by 509 days.

(21) Appl. No.: 13/517,064

(22) PCT Filed: Dec. 22, 2009

(86) PCT No.: PCT/EP2009/009213
§ 371 (c)(1),
(2), (4) Date: Sep. 4, 2012

(87) PCT Pub. No.: WO2011/076231
PCT Pub. Date: Jun. 30, 2011

(65) Prior Publication Data
US 2012/0324079 A1 Dec. 20, 2012

(51) Int. Cl.
*G06F 15/16* (2006.01)
*H04L 29/08* (2006.01)
*H04L 29/06* (2006.01)

(52) U.S. Cl.
CPC ............ *H04L 67/16* (2013.01); *H04L 67/2838* (2013.01); *H04L 67/34* (2013.01); *H04L 65/1096* (2013.01)

(58) Field of Classification Search
CPC ...................................................... G06F 15/173
USPC ........................................................ 709/223
See application file for complete search history.

(56) References Cited

FOREIGN PATENT DOCUMENTS

| EP | 1069746 A1 | 1/2001 |
| EP | 1489814 A2 | 12/2004 |
| WO | 2007073777 A1 | 7/2007 |

*Primary Examiner* — Shripal Khajuria
(74) *Attorney, Agent, or Firm* — Coats & Bennett, PLLC

(57) ABSTRACT

It is described a concept for a service composition which can be carried out in a telecommunication network (100). The described service composition is optimized in view of a composite service execution in a mobile network device (110) having limited resources. According to the described concept, at least one code required for executing the composite service is downloaded from a code storage node (130) to a composition execution agent (112) in response to receiving a corresponding instruction from a service composition node (120), that the service should be composed and/or executed. The actual code to be executed within the network device (110) is selected in response to receiving a service composition command from the service composition node (120). The code selection may take into account local constraints available for the network device (110).

20 Claims, 2 Drawing Sheets

COMPOSITE SERVICES PROVISION WITH CODE DOWNLOAD ON DEMAND

FIELD OF THE INVENTION

The present invention relates to the field of service composition within telecommunication networks.

BACKGROUND OF THE INVENTION

Service composition refers to a technology, where end user services, which are provided to user equipments such as personal computers, laptop computers, or mobile phones of a telecommunications network, are dynamically built by combining constituent services. The selection of the constituent services as components of the composite service may be performed just in time at user request. The needed constituent services are described in terms of required generic properties. Any service that provides the needed properties can be used as part of the composite service. Rather than fixed binding of a particular service any suitable service within a pool of available services can be selected. The pool of available constituent services can change dynamically by adding new services and/or by removing them. A composite service can therefore consist of different constituent services at each invocation. Thus, the set of component services that are actually included into a composite service may not be static, but depending on runtime conditions. The constituent services do not need to be specifically designed for service composition. They can be integrated into a composite service, but they can also work as a single service.

WO 2009/141000 discloses a method of correlating a plurality of service instances by a service composition node, wherein the services are performed by one or a plurality of application servers of a telecommunications network. Thereto, the service composition node performs the steps of invoking a composite service instance corresponding to a service request, and generating a composite service identifier identifying this composite service instance, contacting the one or a plurality of application servers for invoking the plurality of component service instances, wherein the plurality of component service instances are associated to the composite service instance, and sending a first service report comprising an information about the composite service instance to a service supervision system, wherein this information enables the service supervision system to identify reports about the component service instances as being associated to the composite service instance. The service supervision system may be used for charging and billing the user for the composite service(s) provided. For instance for an offline charging, the service composition node might generate a so-called Charge Data Record (CDR) that is transferred to the service supervision system. The CDR might contain the ID of the composite service instance and the IDs of all involved services and sessions. The service supervision system, at the time of processing the record, is then able to correlate the composite service to its components and adapt the resulting charging accordingly.

A special case of execution of composite services or composite applications is given when some or all of the constituent service instances are executed on a network device having only limited hardware and/or software resources. Typically, such resources are often limited when the network device is accessed remotely for instance via the Internet or a cellular network. Further, storage limitations of the network device may prevent it from having all possible services pre-installed and ready to be executed. The latter holds in particular for embedded devices.

In order to overcome storage limitations of the network device it is known to download and install the program code of a service that would be needed to execute some services on the network device. For example, the network device could download and install Open Service Gateway Initiative (OSGi) bundles for these services when instructed to do so. However, for initiating such a download and installation procedure the network device has to specify exactly what bundle must be installed and later executed.

There may be a need for providing flexible solution for executing composite services in particular on a network device having a limited storage capacity.

SUMMARY OF THE INVENTION

This need may be met by the subject matter according to the independent claims. Advantageous embodiments of the present invention are described by the dependent claims.

1# According to a first aspect of the invention there is provided a method for executing a composition of at least a first service instance and a second service instance by a network device of a telecommunication network. The provided method comprises (a) receiving a description of a selected service from a service composition node, (b) initiating selecting a composition of at least a first service instance and a second service instance, wherein the composition is based on the description of the selected service, (c) downloading from a code storage node at least one of a first code of the first service instance and a second code of the second service instance, and (d) executing the composition of the first service instance and of the second service instance by processing both the first code and the second code.

2# According to a first aspect of the invention there is provided a method for initiating executing a composition of at least a first service instance and a second service instance by a network device of a telecommunication network. The provided method comprises (a) initiating transmitting a description of a selected service to a from a service composition node to a network device, (b) selecting a composition of at least a first service instance and a second service instance, wherein the composition is based on the description of the selected service, (c) initiating downloading from a code storage node at least one of a first code of the first service instance and a second code of the second service instance, and (d) initiating executing the composition of the first service instance and of the second service instance by processing both the first code and the second code.

The described methods are based on the idea that based on the description of a selected service the network device or a supporting network entity can make its own decisions about what services should be firstly downloaded from the code storage node and secondly executed. These decisions could be based on any cost function for selecting the respective service instances. Specifically, these decisions could be based for instance (a) on a usage of a memory of the network device, (b) on a load of a Central Processing Unit (CPU) of the network device, (c) on an availability of any other hardware and/or software resources of the network device, (d) on a current load of the telecommunication network, (e) on a requested quality of the service composition and/or (f) on (licensing) costs for the service composition.

In this document the composition of at least the first service instance and the second service instance is also denominated briefly as a composite service or service composition.

Generally speaking, by allowing at least the first code and/or the second code to be downloaded on demand the composite service can be deployed with minimal effort. Thereby, constraints of the network device in terms of storage, processing power and/or connectivity could be taken into account. Compared to the rather static approach often used to download and install code in embedded network devices (e.g., OSGi bundles, firmware upgrades, etc.), the dynamic approach described in this document allows for a much higher flexibility. This may be particularly beneficial in a changing network environment and/or with changing computational load of the network device.

The service composition node may be any central entity of the telecommunication network which entity is responsible for the orchestration of composed services. The service composition node, which may also be denominated briefly a composition engine (CE), may comprise a Business Process Execution Language (BPEL) engine. Within a clustered configuration a BPEL engine may provide for instance a distributed setup by delegating the execution of some services to external network entities.

The code storage node may be any network entity which comprises data storage means, on which the first and/or the second code can be stored. Further, the code storage node may be equipped with an appropriate interface which allows the network device to communicate preferably in a wireless manner with the code storage node.

The network device may any type of communication end device, which is capable of connecting with an arbitrary telecommunication network such as the Internet or a cellular network. Thereby, the connection may be established in particular via a wireless radio transmission link.

In particular, the network device may be an embedded device having limited hardware and/or software resources. The network device may be embedded for instance in a vehicle such as a car, a train, a ship or an aircraft. The network device may just as well be a User Equipment (UE) such as a cellular mobile phone, a Personal Digital Assistant (PDA), a notebook computer and/or any other movable communication end device.

In this document the term "code" has to be understood in a brad manner. Specifically, code can be some program code. However, in addition or instead of executable program code, the network device could also receive configuration options or other data that is/are necessary for the execution of the composite service. For example, the composite service may rely on a codec that may already be installed on the network device but that requires some specific parameters in order to operate correctly.

3# According to an embodiment of the invention selecting a composition at least a first service instance and a second service instance is carried out depending on the availability of resources of the network device, of the service composition node and/or of the code storage node. This may provide the advantage that depending on the actual resources, which are available in particular for downloading and/or for executing the respective code, an appropriate composition selection can be used which does not overcharge the (computational) capability of the network entities and/or of the network connections extending between these network entities which contribute to performing the described method.

In particular it may be possible to make use of a so called capability server, which may provide information about the maximal available and/or the actual available resources of network entities being required for performing the described method.

As has already been indicated above, the composition selection could be based (a) on an availability of a memory, of a CPU and/or of any other hardware and/or software resources of the network device, (b) on a current load of the telecommunication network, (c) on a requested quality of the service and/or (c) on financial costs for the service composition.

4# According to a further embodiment of the invention selecting the composition of at least the first service instance and the second service instance is performed by at least one network entity of the group comprising (a) the network device, in particular a composition execution agent of the network device, (b) the service composition node, (c) the code storage node and (d) a network entity, in particular a service lookup server, which is connected to the network device. This may provide the advantage that the actual selection of the concrete composite service can happen at different network elements and/or at different stages. This may result in a further enhanced flexibility of the described method, which might be adapted depending on resources for data transmission in between different network elements and/or on the actual processing capability of one or more network elements.

The described composition selection by means of the network device and in particular by means of a composition execution agent (CEA) of the network element may be carried out (immediately) when the network device or the CEA receives the description of the selected service. Currently this seems to be the most favorable procedure.

It is mentioned that the described composition selection may also be carried out with some delay by means of the network device or the CEA. For instance when the network device has been provided not only with the codes of the service instances which most suitable match the received description but with more codes which also match to the service description, the network device or the CEA can decide about a selection from the available codes. Thereby, a superior number of service instance codes may be available on a comparatively large memory of the network device being capable of long-term or medium-term storing a plurality of service instance codes and/or by a previous download of more than the best matching service instance codes from the code storage node and/or from a further code storage node. This may mean that the network device has already been provided with more than the necessary service instance codes and the network device and in particular the CEA of the network device decides upon a preferred selection of the available service instance codes, which selection has to be actually executed.

With respect to the composition selection by means of the network entity and in particular by means of the service lookup server being connected to the network device it is mentioned that the network entity or the service lookup server might be capable of evaluating the description of the selected service. This evaluation might yield appropriate identifiers (e.g. the names) of the best matching service instances and optionally the address of the code storage node. Thereafter, these identifiers and optionally the address of the code storage node are transmitted to the (CEA of the) network device.

Given the name of a particular service instance the service lookup server may return the address of the code storage node from where that service instance can be downloaded. The service lookup server or a respective service directory could be merged with the service composition node or with the service storage node or any other code repository of the telecommunication network. The service lookup server could also be responsible for finding the most appropriate service instances according to a set of constraints instead of a service name.

Descriptive speaking, instead of fetching the service instance code(s) directly from the code storage node, the network device or the CEA of the network device could query a lookup service by giving it the description of the selected service. Thereby, the lookup service may be implemented in any network entity and in particular in the service composition node or in the code storage node. The lookup service may return the information about where the service instance code(s) can be fetched from. This information may include the address of the appropriate code storage node or a direct link to the code of the best matching service instance.

It is mentioned that the lookup service can be invoked also by the service composition node before sending the description of the selected service to the network device. Based on the information provided by the lookup service the service composition node may take a decision about where each service instance should be executed.

5# According to a further embodiment of the invention the description of the selected service comprises a set of constraints. Thereby, depending on the respective application the set that the selected service should match may comprise one, two, three or even more constraints. Based on these constraints the network device and in particular a so called composition execution agent (CEA) of the network device selects the appropriate service instances.

It is mentioned that the selection of which service instance(s) should be executed may be based on a set of constraints that are evaluated at run-time.

6# According to a further embodiment of the invention the service composition node and the code storage node are located on the same network entity of the telecommunication network. This may provide the advantage that the described method can be accomplished within a telecommunication network, wherein apart from the network device only one further network entity (i.e. the service composition node) has to be adapted accordingly.

It is mentioned that the code storage node could even be merged with the service composition node. This could be realized for instance by providing a known service composition node with appropriate data storage means and by adapting an interface of the service composition node in such a manner that (a) it can receive download requests from (the CEA of) the network device and that (b) it can provide the above described download capability for (the CEA of) the network device.

7# According to a further embodiment of the invention the method further cornprises (a) providing an application skeleton to the service composition node, and (b) determining the description of the selected service by the service composition node based on the provided application skeleton.

The application skeleton may be provided by any network entity to the service composition node. In particular, the application skeleton may be provided by the network device or the CEA of the network device by an appropriate request message.

As has already been mentioned above the description of the selected service may comprise a set of constraints in order to select which service instances should be executed. In case there are different (CEAs of different) network devices the set of constraints could also comprise an identifier for a (particular CEA of a) preferred network element.

In case several service instances and different network elements or CEAs match the given constraints, the best network element or CEA may be selected arbitrarily or according to some cost function taking into account various parameters such as CPU usage, network latency, current load of the CEAs. Thereby, the current loads can be estimated by the service composition node or can be reported directly by the respective CEAs.

8# According to a further embodiment of the invention the method further comprises (a) transmitting a download request message from the network device to the code storage node, wherein the download request message is indicative for the first code and/or the second code, which are supposed to be downloaded.

The download request message may be transmitted after selecting the composition of at least the first service instance and the second service instance and before downloading the first code and/or the second code.

With the described download request message the network device or the CEA of the network device may ask for the (program) code of the appropriate service instance. If the network device or the CEA already knows exactly what service instance it needs, the download request message may contain either the name or a unique identifier of the respective service instance. Alternatively, if the network device or the CEA delegates the final service instance selection to the code storage node, the download request message may contain a set of merged constraints that the requested service instance should match.

As has already been mentioned above the code storage node can be a part of the service composition node. Alternatively, the code storage node can be any network entity being separated from the network device.

9# According to a further embodiment of the invention (a) the first code is stored in the network device such that a download of the first code is needless and (b) the second code is downloaded from the code storage node. This may provide the advantage that codes, which are already stored in and/or installed on the network device can be used as a contribution to the described service composition. As a consequence, the load on the telecommunication network, which is based on the described download from the code storage node, can be reduced significantly. Further, due to a reduced amount of download data the composite service on the network device can be established soon after the service composition has been selected.

Descriptive speaking, the network device or the CEA of the network device can dynamically fetch the code of the service instance composition, which code is not yet available on the network device. This means that only those codes have to be downloaded which are not stored in the network device for instance because of a previous download of the code of the respective service instance.

10# According to a further embodiment of the invention (a) the first code is downloaded from the code storage node and (b) the second code is downloaded from a further code storage node. This may provide the advantage that the code being necessary for the described service composition can be retrieved or downloaded from several code repositories. This makes the described composite service execution method even more flexible.

11# According to a further embodiment of the invention the method further comprises removing at least one of the first code and the second code from the network device. This may provide the advantage that storage resources of the network device can be released, which are allocated to (composite) service(s) and which are no longer needed. If required, the released storage resources can be immediately used for further (composite) service(s).

Descriptive speaking, if the network device of the CEA of the network device needs to free up some local resources, it can delete the code of those services instances, which services instances (a) have already been executed and (b) are probably no more needed. Alternatively, the removed code(s) can be kept in a cache memory in case they should be deleted later and/or in case they are still needed (in contrary to the previous expectation). Thereby, various cache expiration techniques may be employed.

12# According to a further embodiment of the invention the network device, the service composition node and/or the code storage node are components of an IP Multimedia Subsystem. This may provide the advantage that the described composite service execution method can be used for efficiently providing composite multimedia services to the network device, which may be connected via a radio network and/or an IP core network to the service composition node and/or the code storage node.

13# According to a further aspect of the invention there is provided a network device for executing a composition of at least a first service instance and a second service instance. The provided network device comprises (a) a receive unit which is adapted to receive a description of a selected service from a service composition node, (b) an initiation unit which is adapted to initiate selecting a composition of at least a first service instance and a second service instance, wherein the composition is based on the description of the selected service, (c) a download unit which is adapted to download from a code storage node at least one of a first code of the first service instance and a second code of the second service instance, and (d) a processor which is adapted to execute the composition of the first service instance and of the second service instance by processing both the first code and the second code.

Also the described network device is based on the idea that in order to execute a composite service by the (remote) network device the service composition node, which may also be called a composition engine, sends to the network device or to a composition execution agent (CEA) of the network device a description of a composite service that it should execute. If necessary, the network device respectively the CEA fetches the necessary codes for this composite service from the code storage means, which may also be called a code repository. Thereafter, the codes of the service instance contributing to the composite service are executed.

The selection of which service instance should be executed may be based on a set of constraints that are evaluated at run-time. It is not necessary however not excluded, that the description contains a direct link to the service instance itself.

If the network device or its CEA detects that it does not have this service installed locally, it then may make a decision about what to download based on the service description that it has received. This decision may be influenced by various cost factors such as the availability of local resources and various characteristics of the available services. The download may be initiated by a corresponding download request message, which is transmitted from the network device to the code storage node. Thereby, the code storage node may also influence the service selection for instance by some service instances which are not available and/or by other services which are available with reduced financial and/or computational expenses. After having downloaded the respective code this code may be installed and executed at the network device.

The receiving unit may be for instance an interface, in particular a radio interface, which allows for establishing a (radio) connection between (a) the network device and (b) the service composition node and/or the code storage node.

14# According to a further aspect of the invention there is provided a service composition node for coordinating at least a first service instance and a second service instance. The provided service composition node is adapted to perform the above described composite service execution method.

15# According to a further aspect of the invention there is provided a code storage node for providing a code to a network device of a telecommunication network upon a download request. The provided code storage node is adapted to perform the above described composite service execution method.

16# According to a further aspect of the invention there is provided a computer-readable medium on which there is stored a computer program for executing a composition of at least a first service instance and a second service instance. The computer program, when being executed by a data processor, is adapted for controlling or for carrying out the above described composite service execution method.

The computer-readable medium may be readable by a computer or by a processor. The computer-readable medium may be, for example but not limited to, an electric, magnetic, optical, infrared or semiconductor system, device or transmission medium. The computer-readable medium may include at least one of the following media: a computer-distributable medium, a program storage medium, a record medium, a computer-readable memory, a random access memory, an erasable programmable read-only memory, a computer-readable software distribution package, a computer-readable signal, a computer-readable telecommunications signal, computer-readable printed matter, and a computer-readable compressed software package.

17# According to a further aspect of the invention there is provided a program element for executing a composition of at least a first service instance and a second service instance. The program element, when being executed by a data processor, is adapted for controlling or for carrying out the above described composite service execution method.

The program element may be implemented as computer readable instruction code in any suitable programming language, such as, for example, JAVA, C++, and may be stored on a computer-readable medium (removable disk, volatile or non-volatile memory, embedded memory/processor, etc.). The instruction code is operable to program a computer or any other programmable device to carry out the intended functions. The program element may be available from a network, such as the World Wide Web, from which it may be downloaded.

The invention may be realized by means of a computer program respectively software. However, the invention may also be realized by means of one or more specific electronic circuits respectively hardware. Furthermore, the invention may also be realized in a hybrid form, i.e. in a combination of software modules and hardware modules.

It has to be noted that embodiments of the invention have been described with reference to different subject matters. In particular, some embodiments have been described with reference to method type claims whereas other embodiments have been described with reference to apparatus type claims. However, a person skilled in the art will gather from the above and the following description that, unless other notified, in addition to any combination of features belonging to one type of subject matter also any combination between features relating to different subject matters, in particular between features of the method type claims and features of the apparatus type claims is considered as to be disclosed with this document.

The aspects defined above and further aspects of the present invention are apparent from the examples of embodiment to be described hereinafter and are explained with reference to the examples of embodiment. The invention will be described in more detail hereinafter with reference to examples of embodiment but to which the invention is not limited.

DETAILED DESCRIPTION OF THE INVENTION

Figure 1:
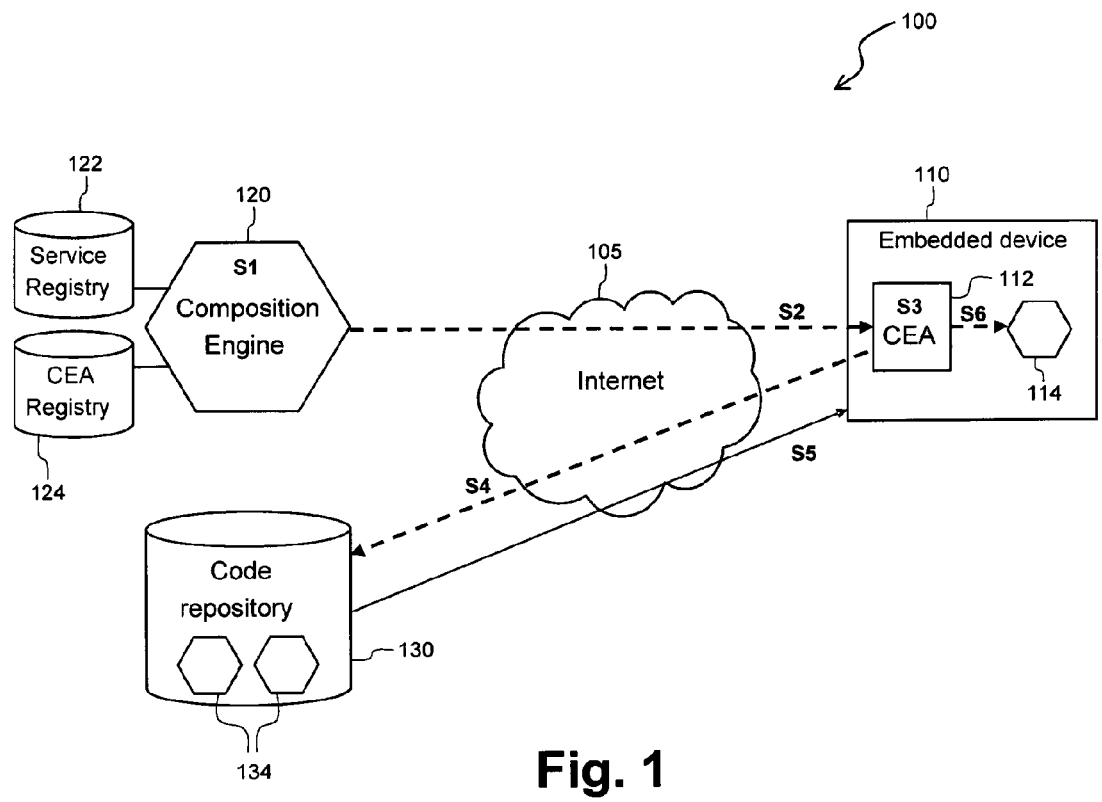
FIG. 1 shows a telecommunication network comprising an embedded network device, which performs a code download on demand from a code storage node.

The illustration in the drawing is schematically. It is noted that in different figures, similar or identical elements are provided with the same reference signs.

FIG. 1 shows a telecommunication network 100, which is adapted to perform a composite service execution method in accordance with a preferred embodiment of the invention. The telecommunication network 100 comprises an embedded network device 110. According to the embodiment described here the network device 110 is embedded in a mobile vehicle such as in a car. The embedded network device 110, which may be any mobile device and which may be denominated a User Equipment (UE), is connected via a wireless radio connection to a core network 105. According to the embodiment described here the core network is the internet 105.

As can be seen from FIG. 1, the embedded network device 110 further comprises a composition execution agent (CEA) 112 and data processing and storage means 114. These components of the embedded network device 110 will be described below in more detail.

The telecommunication network 100 furthermore comprises a service composition node 120, which in this document is also denominated a composition engine (CE). The service composition node 120 is connected via the internet 105 to the mobile embedded network device 110. The service composition node 120 is connected to a service registry 122 and to a CEA registry 124.

Further, the telecommunication network 100 comprises a code storage node 130, which in this document is also denominated a code repository (CR). The code storage node 130 is equipped with data processing and storage means 134.

In the following a composite service execution by the embedded network device 110 is described, wherein in preparation of the composite service execution the embedded network device 110 performs a dynamic code download on demand from the code storage node 130.

In a first step, which is indicated in FIG. 1 with "S1", the service composition node 120 interprets an application skeleton, which has been provided to the service composition node 120 by any other network entity of the telecommunication network 100. Based on this application skeleton the service composition node 120 evaluates a description of a selected service, which meets the requirements of the application skeleton. According to the embodiment described here the description comprises several constraints for the selected service. This means that the constraints are indicative for the selected service which is supposed to be executed and which CEA 112 should execute them.

According to the embodiment described here the service composition node 120 uses information from the service registry 122 and from the CEA registry 124. The service registry 122 contains a list of available services. The CEA registry 124 contains the list of available CEAs and the services that they can run. Thereby, the services which can be run may have already been installed on the respective CEA or may be downloadable from any code storage node such as the code storage node 130. Preferably, the registries 122 and 124 are closely linked to the service composition node 120 or be even be part of it. However, some remote setups would also be possible but be less efficient.

It is mentioned that in case several services and CEAs match the given constraints, the best CEA 112 is selected arbitrarily or according to some cost function taking into account various parameters such as for instance CPU usage, network latency and/or current load of the CEAs (estimated by the service composition node 120 or reported directly to the service composition node 120 by the respective CEAs).

In a second step, which is indicated in FIG. 1 with "S2", the service composition node 120 sends to the selected CEA 112 a service execution request containing an implicit reference to the service that should be executed. Instead of sending a direct link, name or unique identifier of the service to be executed, the service composition node 120 sends a set of constraints that the selected service should match. Optionally, together with the set of constraints or in a separate message, the service composition node 120 could also send several descriptions or direct links to codes of services that are known to match these constraints so that the CEA 112 could choose among them if it does not know them already.

It is mentioned that with respect to the second step S2 it is possible to add one level of indirection: Instead of sending a service description directly to the CEA 112, the service composition node 120 could first send the name or a unique identifier of the service to be executed. If the CEA 112 recognizes that it does not know about it, the CEA 112 sends a reply to the service composition node 120 or a request to another server of the telecommunication network 100, telling it that it does not have that service available. The service composition node 120 or the other server replies with the set of constraints that the service should match or with a direct link to the code of the service.

In a third step, which is indicated in FIG. 1 with "S3", the CEA 112 evaluates the received set of constraints in the service execution request and merges them with local constraints of the embedded network device 110. Such local constraints may be for instance the platform type of the device 110, the availability of resources and/or various cost factors. Based on the received set of constraints and on the local constraints the CEA 112 restricts the set of valid services. If the CEA 112 already has a service installed that matches all these constraints, then it executes it as requested. If the CEA 112 does not have this service installed, then it tries to download it as described in the following steps.

In a fourth step, which is indicated in FIG. 1 with "S4", the CEA 112 sends a download request to the code storage node 130, asking the code storage node 130 for the code of the appropriate service(s). This download request contains either the name or a unique identifier of the respective service. Alternatively, if the CEA 112 does (not yet) know exactly what service it needs and/or if the CEA 112 delegates the final code selection to the code storage node 130, the download request contains a set of merged constraints that the selected service should match. In this case the data processing and storage means 134 of the code storage node 130 will decide about the final code.

It is mentioned that the code storage node 130 can be a part of the service composition node 120 or it can be a separate network entity being connected to the telecommunication network 100.

In a fifth step, which is indicated in FIG. 1 with "S5", the code storage node 130 sends the code of the requested service to the CEA 112.

In this respect it is mentioned that the term "code" should be understood in a broad sense. Code can be for instance some executable program code, but in addition or instead of an executable program code, the CEA 112 could also receive from the code storage node 130 configuration options or other data that is/are necessary for the execution of the service. For example, the service may rely on a codec that may already be installed on the embedded network device 110 which however requires some specific parameters in order to operate correctly.

In a sixth step, which is indicated in FIG. 1 with "S6", the downloaded code is installed locally and then executed on the data processing and storage means 114.

In an optional seventh step, which not indicated in FIG. 1, the CEA 112 can delete the code of the service from the on the data processing and storage means 114 after it has executed. This may be necessary if the data processing and storage means 114 needs to free up some local resources. Alternatively, the data processing and storage means 114 can keep the code in a cache and use various cache expiration techniques in order to delete it later.

Figure 2:
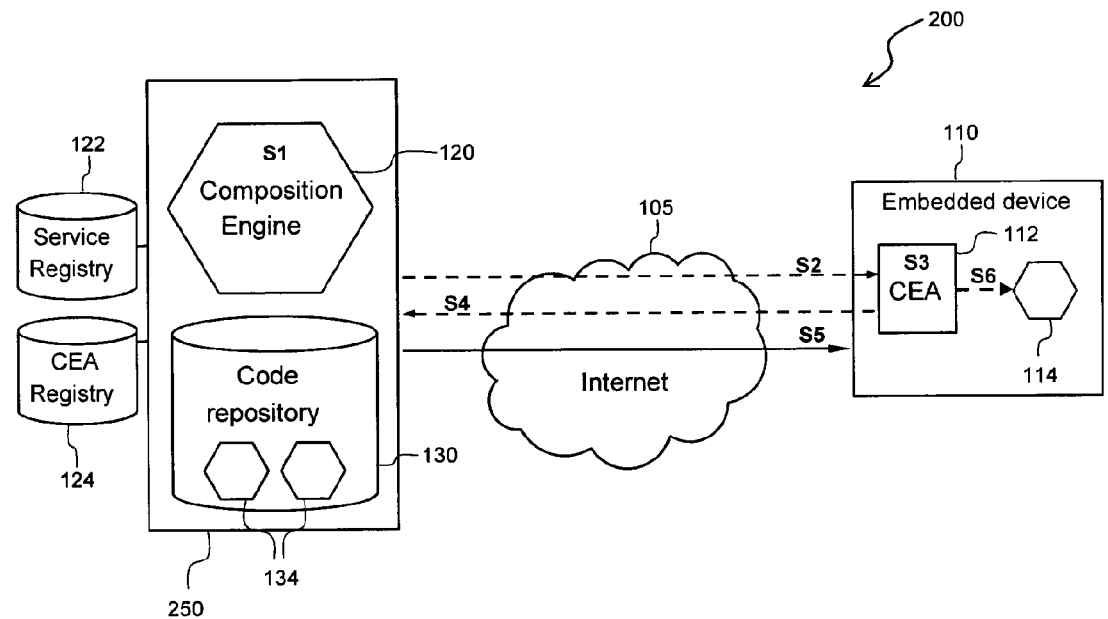
FIG. 2 shows a telecommunication network comprising an embedded network device, which performs a code download on demand from a code storage node being realized together with a service composition node in a common network node.

FIG. 2 shows a telecommunication network 200 according to a further embodiment of the invention. By contrast to the telecommunication network 100 the telecommunication network 200 comprises a network node 250, which comprises both the service composition node 120 and the code storage node 130. The other components of the telecommunication network 200 correspond to the respective components of the telecommunication network 100 and will not be described again in etail. The same holds for the above described steps S1 to S6 and the optional sevenths step, which can be performed by the telecommunication network 200 in the same manner as described above.

Figure 3:
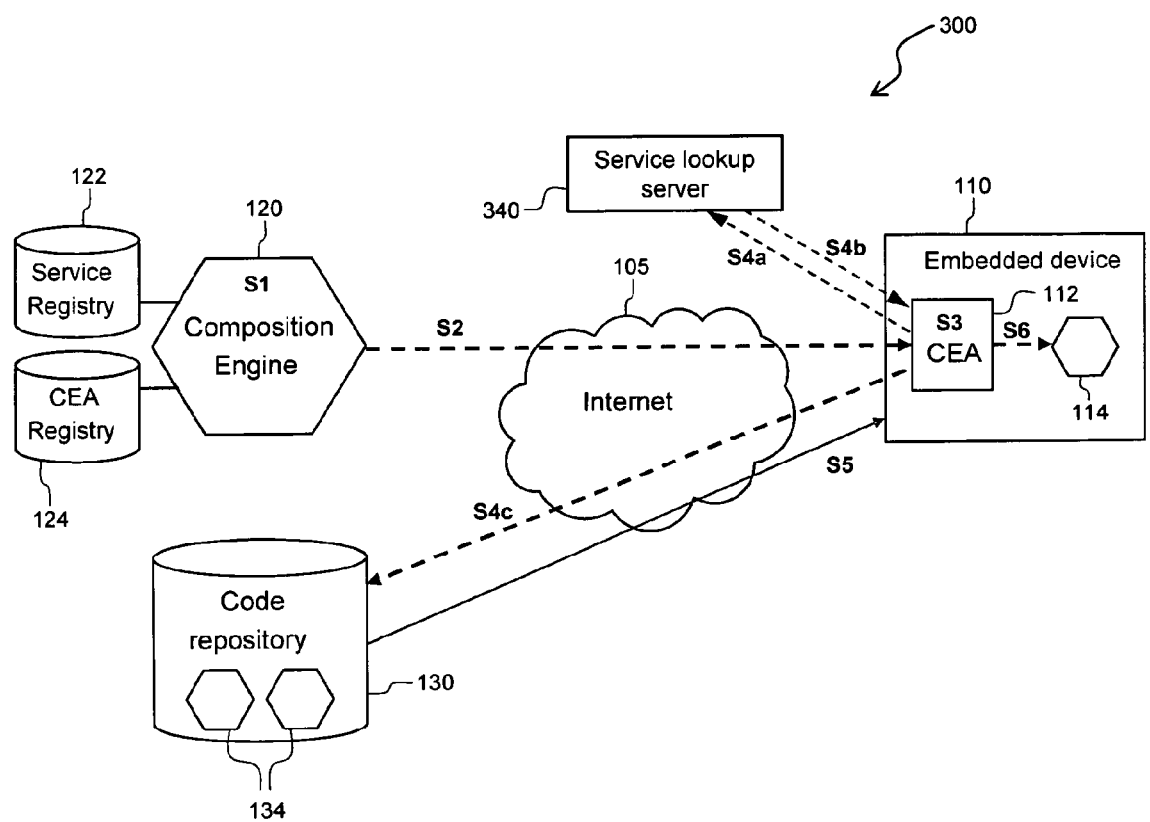
FIG. 3 shows a telecommunication network comprising an embedded network device, which request information from a service lookup server in order to select an appropriate code storage node for performing a code download on demand.

FIG. 3 shows a telecommunication network 300 according to a still further embodiment of the invention. In addition to the telecommunication network 100 shown in FIG. 1 the telecommunication network 300 comprises a service lookup server 340, which is connected to the CEA 112 of the embedded network device 110. In preparation for a download request message from the CEA 112 to the code storage node 130, which in FIG. 3 is indicated with "S4c", the CEA 112 first sends the set of constraints to the service lookup server 340 (see "S4a" in FIG. 3). The service lookup server 340 then evaluate these constraints and returns the name of the best matching service and the address of the code storage node that has it to the CEA 112 (see "S4b" in FIG. 3). The CEA 112 then requests the code of that service from the code storage node (see "S4c" in FIG. 3). This means that by using the service lookup server 340 one level of indirection is added with respect to the embodiment shown in FIG. 1. According to the embodiment described here instead of the CEA 112 the service lookup server 340 as a separate network entity is doing the matching of constraints for selecting the most appropriate service.

Compared to known IP Multimedia Subsystem (IMS) service composition in which all services are executed in the operator's network or by some service providers, the execution of services in remote devices allows the creation of composite applications in which some parts can be executed closer to the user. For example services executed on a home IMS gateway could access other devices located inside the user's home network. Further, services executed in a car or other mobile vehicle for instance on an onboard unit could have more direct access to the car data without requiring round-trips over the mobile network connection. Furthermore, services running in a mobile phone could access sensor data, communicate with devices in a personal area network or simply have more direct interaction with the user.

Compared to the rather static approach often used to download and install codes in embedded devices (e.g. OSGi bundles, firmware upgrades, etc.), the described dynamic approach based on constraints evaluated at run-time allows more flexibility. It also allows the service composition node respectively the composition engine (CE) and the composition execution agents (CEAs) to take more appropriate decisions about which service should be executed depending on various factors in a changing environment.

For example, a new vendor may provide a better version of some service but with the additional constraint that it only runs on some specific embedded devices or only if the device is connected to a specific network. The CEAs for which these constraints are satisfied could use this new version of the service, while other network devices would use the more generic version. This decision could be taken by the CEAs and/or by the service composition node respectively the CE, if it knows the characteristics of all CEAs.

Another example would be that several implementations of a service are available: One of them is described as requiring more memory, while the other one is described as consuming more CPU time. Depending on the current situation known by the CEA (memory usage and CPU load) and on the selected cost function, it could prefer one implementation over the other.

In order to recapitulate the above described embodiments of the present invention one can state: In this document there is described a concept for a service composition which can be carried out in a telecommunication network in particular in connection with an Internet Multimedia Subsystem (IMS). The described service composition is optimized in view of a composite service execution in a network device having limited resources, such as a mobile device, a device embedded in a car or the like. According to the described concept, at least one code required for executing the composite service is downloaded from a code storage node to a composition execution agent (CEA) in response to receiving a corresponding instruction from a service composition node, that the service should be composed and/or executed. Rather than being predefined, the actual code to be executed within the network device is selected in response to receiving a service composition (or service execution) command from the service composition node. The code selection may take into account local constraints available for the network device. Local constraints may be for instance the actual resource consumption like actual CPU load, actual storage consumption, or other actual hardware and/or software resource consumptions. In accordance with the actual resource consumption an appropriate service may be selected, that puts lesser demands on a resource that has already been "consumed" to a large extend. Alternatively, a service may be selected that is capable of being run on the resources being available on the particular resources of the network device.

It should be noted that the term "comprising" does not exclude other elements or steps and "a" or "an" does not exclude a plurality. Also elements described in association with different embodiments may be combined. It should also be noted that reference signs in the claims should not be construed as limiting the scope of the claims.

LIST OF REFERENCE SIGNS 100 telecommunication network
105 core network/Internet
110 network device/embedded (network) device/mobile device/user equipment (UE)
112 composition execution agent (CEA)
114 data processing and storage means
120 service composition node/composition engine (CE)
122 service registry
124 CEA registry
130 code storage node/code repository (CR)
134 data processing and storage means
200 telecommunication network
250 network node
300 telecommunication network
340 service lookup server

The invention claimed is:

1. A method for executing a composition of at least first and second service instances by a network device of a telecommunication network, the method comprising:
receiving a description of a selected service from a service composition node;
initiating selecting a composition of at least the first and second service instances, wherein the composition is based on the description of the selected service;
downloading, from a code storage node, at least one of:
a first code of the first service instance; and
a second code of the second service instance;
executing the composition of the first service instance and of the second service instance by processing both the first code and the second code.

2. The method of claim 1 wherein the selecting the composition is carried out depending on at least one of:
availability of resources of the network device;
availability of resources of the service composition node;
availability of resources of the code storage node.

3. The method of claim 1 wherein the selecting the composition is performed by at least one network entity from the group comprising:
a composition execution agent of the network device;
the service composition node;
the code storage node;
a service lookup server which is connected to the network device.

4. The method of claim 1 wherein the description of the selected service comprises a set of constraints.

5. The method of claim 1 wherein the service composition node and the code storage node are located on the same network entity of the telecommunication network.

6. The method of claim 1 further comprising:
providing an application skeleton to the service composition node;
the service composition node determining the description of the selected service based on the provided application skeleton.

7. The method of claim 1:
further comprising transmitting a download request message from the network device to the code storage node;
wherein the download request message is indicative of at least one of the first and second codes which are supposed to be downloaded.

8. The method of claim 1:
wherein the first code is stored in the network device such that a download of the first code is needless;
wherein the second code is downloaded from the code storage node.

9. The method of claim 1:
wherein the first code is downloaded from the code storage node;
wherein the second code is downloaded from a further code storage node.

10. The method of claim 1 further comprising removing at least one of the first and second codes from the network device.

11. The method of claim 1 wherein the network device at least one of the service composition node and the code storage node are components of an IP Multimedia Subsystem.

12. A method for initiating executing a composition of at least first and second service instances by a network device of a telecommunication network, the method comprising:
initiating transmission of a description of a selected service from a service composition node to a network device;
selecting a composition of at least a first service instance and a second service instance, wherein the composition is based on the description of the selected service;
initiating downloading, from a code storage node, at least one of:
a first code of the first service instance; and
a second code of the second service instance;
initiating executing the composition of the first service instance and of the second service instance by processing both the first code and the second code.

13. The method of claim 12 wherein the selecting the composition is carried out depending on at least one of:
availability of resources of the network device;
availability of resources of the service composition node;
availability of resources of the code storage node.

14. The method of claim 12 wherein the selecting the composition is performed by at least one network entity from the group comprising:
a composition execution agent of the network device;
the service composition node;
the code storage node;
a service lookup server which is connected to the network device.

15. The method of claim 12 wherein the description of the selected service comprises a set of constraints.

16. The method of claim 12 further comprising:
providing an application skeleton to the service composition node;
the service composition node determining the description of the selected service based on the provided application skeleton.

17. The method of claim 12 wherein the second code is downloaded from the code storage node.

18. A network device for executing a composition of at least first and second service instances, the network device comprising:
a receive unit configured to receive a description of a selected service from a service composition node;
an initiation unit configured to initiate selecting a composition of at least the first and second service instances, wherein the composition is based on the description of the selected service;
a download unit configured to download, from a code storage node, at least one of:
a first code of the first service instance; and
a second code of the second service instance;

a processor which configured to execute the composition of the first and second service instances by processing both the first code and the second code.

19. A computer program product stored in a non-transitory computer readable medium for executing a composition of at least first and second service instances, the computer program product comprising software instructions which, when run on a data processor of a network device of a telecommunication network, causes the network device to:
- receive a description of a selected service from a service composition node;
- initiate selecting a composition of at least the first and second service instances, wherein the composition is based on the description of the selected service;
- download, from a code storage node, at least one of:
  - a first code of the first service instance; and
  - a second code of the second service instance;
- execute the composition of the first service instance and of the second service instance by processing both the first code and the second code.

20. A computer program product stored in a non-transitory computer readable medium for initiating executing a composition of at least first and second service instances, the computer program product comprising software instructions which, when run on a data processor of a network device of a telecommunication network, causes the network device to:
- initiate transmitting a description of a selected service to a from a service composition node to a network device;
- select a composition of at least a first service instance and a second service instance, wherein the composition is based on the description of the selected service;
- initiate downloading, from a code storage node, at least one of:
  - a first code of the first service instance; and
  - a second code of the second service instance;
- initiate executing the composition of the first service instance and of the second service instance by processing both the first code and the second code.

* * * * *